United States Patent [19]

Pettersson

[11] Patent Number: 4,533,433
[45] Date of Patent: Aug. 6, 1985

[54] METHOD OF COVERING THE CHEMICAL LOSSES IN PULP PRODUCTION

[75] Inventor: Karl B. Pettersson, Gävle, Sweden

[73] Assignee: A. Ahlstrom Osakeyhtio, Noormarkku, Finland

[21] Appl. No.: 598,307

[22] PCT Filed: Jul. 11, 1983

[86] PCT No.: PCT/SE83/00280

§ 371 Date: Mar. 8, 1984

§ 102(e) Date: Mar. 8, 1984

[87] PCT Pub. No.: WO84/00390

PCT Pub. Date: Feb. 2, 1984

[30] Foreign Application Priority Data

Jul. 12, 1982 [SE] Sweden ............... 8204266

[51] Int. Cl.³ .................................. D21C 11/10
[52] U.S. Cl. .................... 159/47.3; 162/29; 162/30.1; 162/30.11; 162/36
[58] Field of Search ............ 159/47.3, 47.1, 49, 159/DIG. 8; 162/29, 30.1, 30.11, 36; 400/97

[56] References Cited

U.S. PATENT DOCUMENTS 3,286,763 11/1966 Jacoby ..................... 159/47.3
3,289,736 12/1966 Rosenblad ............... 159/47.3
3,299,942 1/1967 Jacoby ........................ 159/17
4,076,576 2/1978 Marttala ................. 159/47.3
4,426,322 1/1984 Stage ........................ 159/49

FOREIGN PATENT DOCUMENTS 2757474 6/1978 Fed. Rep. of Germany .
183628 5/1963 Sweden .
319962 1/1970 Sweden .

OTHER PUBLICATIONS

Pulp & Paper, 1979, pp. 92-95.
Inkruster II, Sulfatfabrike-SPCI-Meddelande Nr 36, pp. 28-29, (1981).

Primary Examiner—William Smith
Attorney, Agent, or Firm—Bucknam and Archer

[57] ABSTRACT

A method for keeping the heating surfaces in the final thickener (VI), which is divided into several sections (A,B,C), clean in evaporating waste liquors in pulping processes for recovering the cooking chemicals. Chemical solutions e.g. residual products from other processes as tall oil separation and chlorine dioxide production are added to cover the chemical losses. According to the invention the chemical solutions are supplied to those sections of the final thickener which are at the time not being washed with thick waste liquor from the preceding evaporator (II).

3 Claims, 1 Drawing Figure

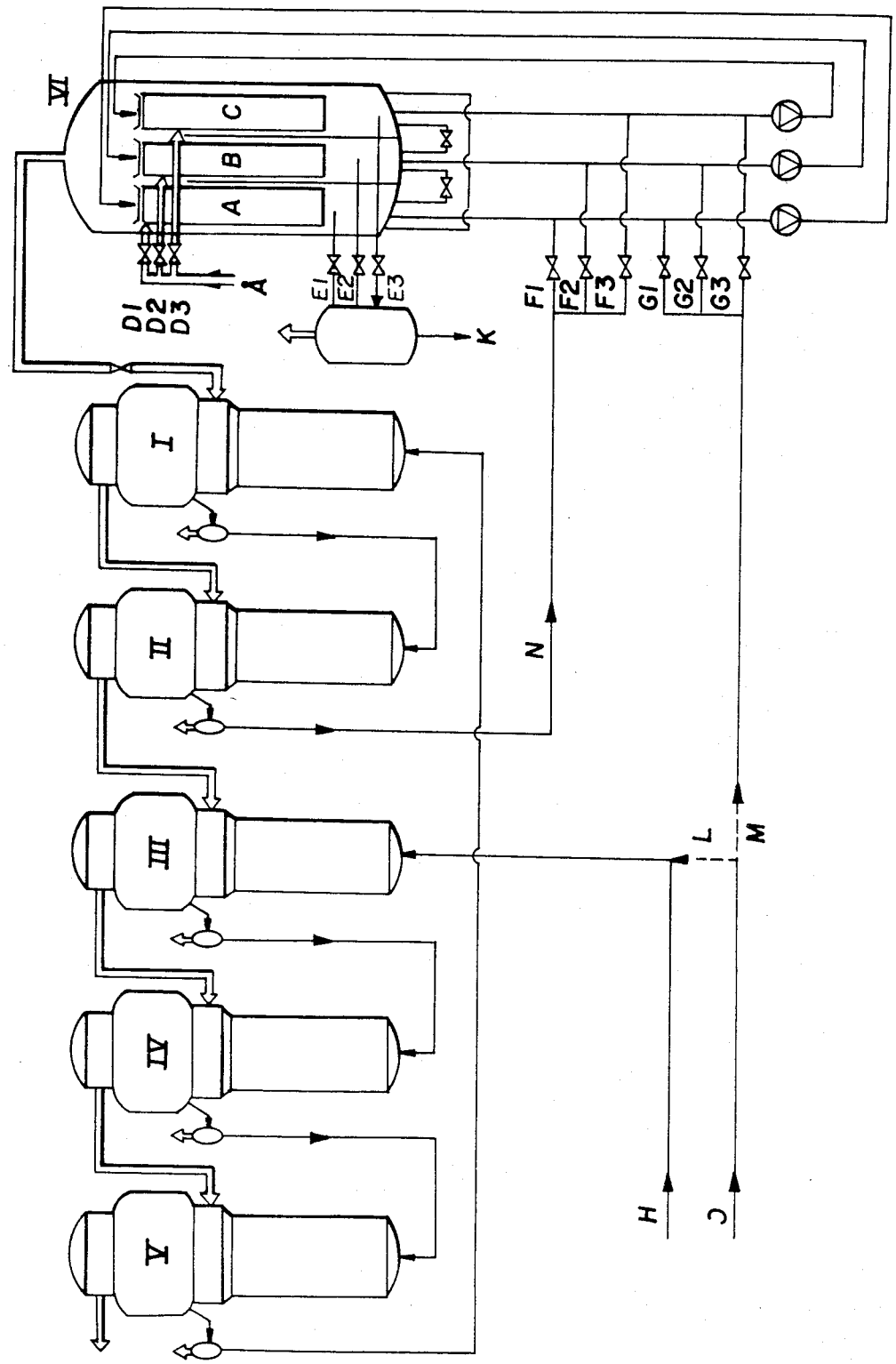

METHOD OF COVERING THE CHEMICAL LOSSES IN PULP PRODUCTION

In many pulping processes chemical losses may be replaced by residual solutions from other processes either from the same factory or from other factories.

In the following the sulphate pulping process is discussed but the situation is similar in other processes for the production of pulp.

Examples of residual solutions which can be used to cover the chemical losses are splitting liquid from splitting of soap skimmings and residual acid from the production of chlorine dioxide.

Two processes are currently known for supplying these residual solutions to the chemical cycle. In one of the processes the residual solutions are mixed into the spent liquor to be evaporated, i.e., prior to evaporation. In the other process they are mixed into the already evaporated spent liquor, the concentrated waste liquor, immediately before the spraying into the soda recovery boiler.

When splitting soap skimmings with acid to obtain tall oil, a splitting liquid is obtained which contains sodium sulphate and lignin. In the process for production of chlorine dioxide, used as a bleaching chemical for pulp, a residual acid solution is obtained which contains considerable quantities of sodium sulphate and sulphuric acid. The residual acid solution can be used for splitting of the soap skimmings. The splitting liquid thus formed, and any excess of residual acid, can be used to cover the chemical losses in the sulphate process.

Both the splitting liquid and the residual acid solution have a very low dry matter content, usually less than 25%.

In the former process of adding residual solutions, by addition to the weak liquor, the sodium sulphate content in the liquor will increase considerably during its passage through the evaporation plant. Like sodium carbonate, sodium sulphate has what is known as a reversed solubilty, i.e. its solubility decreases with increasing temperature. In the evaporation process, which takes place within a temperature range of from about 145° C. to 55° C., higher temperatures at higher dry matter contents are advantageous from the point of view of thermal economy and of the viscosity of the liquor. This means that with dry matter contents of about 40-45% in a certain temperature range, the limit is reached for the solubility of inorganic salts in the solution. These will therefore crystallize on the heating surfaces in the evaporation plant and these surfaces must therefore be washed. A liquor having a considerably lower dry matter content must be used for this purpose, e.g., a mixed-base liquor or water. The washing process must be performed with reduced steam supply, resulting in loss of capacity. Furthermore, if water is used, the need of evaporation is also increased. However, the heating surfaces being contaminated due to the saturation condition for inorganic salts is not the only drawback of this method. Since the splitting liquid and the residual acid pass through the entire evaporation plant, which usually comprises 5-7 steps, the proportion of inorganic impurities increases in relation to the proportion of organic impurities in the black liquor as compared with if no addition is made to the weak liquor, whereupon the rise in boiling point at each evaporation step also increases. With an increased rise in boiling point, the effective temperature difference for the evaporation process is reduced, resulting in loss of capacity. The advantage of adding splitting liquid and residual acid in this way as compared with the other knowm method—addition to the concentrated waste liquor—is that water in the splitting liquid and residual acid can be economically evaporated in 5-7 steps.

In the second known process, the addition of residual acid and splitting liquid to the concentrated waste liquor, the heating surfaces in the evaporation plant will be less contaminated, since saturation conditions are not reached. The need of washing is thus reduced. However, since both splitting liquid and residual acid have a considerably lower dry matter content that the already evaporated black liquor, the dry matter content of the liquor to the soda recovery boiler will be lowered, resulting in a reduction in efficiency of this boiler.

In the sulphate pulping industry the evaporation process is normally performed in 5-7 stages, or even more. The heating surfaces in the evaporation stages may consist of tubes or lamellas. Fresh vapour is supplied to the first stage and the secondary vapour generated in this is supplied to the second stage, and so on.

To achieve a dry matter content higher than 60% for the black liquor, final thickeners are generrlly used. In the case of tubular heating surfaces the final thickeners normally have forced circulation, are located parallel to the first and second stages and fresh steam is supplied to the first of the final thickeners. The dry matter content range for the final thickeners is normally from about 55% to 65%. If the heating surfaces consist of lamellas and the final thickener functions on the falling film principle, the entire first stage of the evaporation plant acts as final thickener. The dry matter content of liquor supplied to this type of final thickener is generally 40-45% and after this, 65% or more. The final thickener according to the falling film principle is divided into two or three sections on the liquor side. The sections are mutually interchangeable, the section giving the highest dry matter content before a changeover afterwards receiving liquor with a dry matter content of 40-45%. This procedure enables the heating surfaces to be washed without supplying weaker liquor or water and without loss of evaporation capacity.

If the splitting liquid and/or residual acid is added to the weak liquor before the evaporation process, the content of sodium sulphate in the whole evaporation plant will increase. Even at a dry matter content of 40-45%, the liquor supplied to the final thickener will be very close to or even over the saturation limit for inorganic salts. This means that the washing gives a poor result since the salts can crystallize at this low matter content.

According to the invention, splitting liquid and residual acid are supplied to the final thickener. If there are three sections in the final thickener, these liquids are preferably added to the second and/or third section. The first section is in this case the section to which the liquor is supplied. By this the liquor passing the other stages of the evaporation plant and the first section of the final thickener will not contain the inorganic salts being present in the splitting liquid and residual acid. This means that there will be no additional rise in the boiling point in the other stages of the evaporation plant and consequently no loss in capacity. Furthermore, the content of inorganic salts in the first section of the final thickener is considerably below the saturation limit and efficient washing of the heating surface can thus be achieved. Another advantage of the procedure according to the invention is that it facilitates the introduction of additional evaporation steps.

Although the second and/or third sections of the final thickener become contaminated, when splitting liquid and residual acid are added, due to the high content of inorganic salts, efficient washing of the entire heating surface can be achieved by means of the programmed automatic changeover for washing the three sections. This avoids shutdowns for separate washing and consequential loss in capacity. Furthermore, there is no drop in dry matter content in the concentrated waste liquor, as opposed to if the residual solutions are supplied directly to the liquor prior to the soda recovery boiler.

The residual acid and splitting liquid can be added separately or together, either directly to the circulation system of the final thickener or to the final thickener unit.

The invention is applicable both to final thickeners with lamellar heating surfaces functioning in accordance with the falling film principle and to final thickeners of the forced circulation type with tubular or lamellar heating surfaces.

To exemplify the advantages of the invention a six-step evaporation plant (215 tons evaporated water per hour) may be stated, with a final three section thickener. This final three section evaporator is shown on the drawing. On this drawing I–VI are evaporators (stages). They are in respect of the conveyance of liquor connected in series in the sequence III, IV, V, I, II and VI. VI is the final evaporator (final thickener). A, B and C are the three sections in the final evaporator VI.

D1, D2 and D3 are valves for the supply of steam, A, to section A, B, and C of final evaporator VI E1, E2 and E3 are valves for discharging thick waste liquor (fully evaporated liquor) K from the final evaporation F1, F2 and F3 are valves for the supply of semi-thickened waste liquor N to the final evaporation, and G1, G2 and G3 are valves for supplying redidual solution J when this in accordance with the invention is conducted by the alternative M, to the sections A, B and C respectively.

H is mixed liquor entering into the evaporator plant, that is waste liquor from the digester house mixed with thick waste liquor K.

L is the connection alternative which applies for the supply of residual solution to the evaporator plant in accordance with the conventional process.

M is as already stated the connection alternative of the invention.

According to previous practice the evaporation takes place in the following way.

To the mixed liquor H, with a dry matter content of 22% by weight, is added residual solution J by the connection L and the liquor is conveyed ot the evaporator III. The semi-thickened waste liquor N from the evaporator II has a dry matter content of 47% by weight. In the clean washing period shown on the drawing semi-thickened waste liquor N is supplied to the section A of the evaporator VI through the valve F1. At the same time fresh steam A is supplied to all sections A, B and C through the valves D1, D2 and D3 but generally in a smaller quantity to section A through the valve D1. One part of the liquor from the bottom of section A is brought back to the top of section A and the other part is transferred to section B where the evaporation is continued. From section B one part of the evaporated liquor is in the same way transferred to section C. The fully evaporated liquor N is discharged from section C by the valve E3.

In th following periods the valves are positioned to wash the sections B and C respectively.

This is, however, not sufficient but the evaporator once a day has to be shut down to be washed with a weaker liquor at a lower temperature.

According to the invention the mixed liquor is added to the evaporator III without being mixed with the residual solution J.

The residual solution J is by the connection alternative M conveyed through the valve G2 to the section B of the final evaporator.

At the same time semi-thickened waste liquor N is fed to section A through the valve F1 to be washed clean. As this liquor N does not contain residual solution J the washing will be efficient and it will not be necessary to shut down the evaporator VI. More fresh steam A than what is used in a conventional process can in this case be conveyed to section A through the valve D1.

The valve timing in the three periods required by the three section evaporator VI is controlled by a micro processor as follows.

| In washing of section | Valve position, O = open, X = closed, Y = partly open | | | | | | | | | | | |
|---|---|---|---|---|---|---|---|---|---|---|---|---|
| | D1 | D2 | D3 | E1 | E2 | E3 | F1 | F2 | F3 | G1 | G2 | G3 |
| A | Y | O | O | X | X | O | O | X | X | X | O | X |
| B | O | Y | O | O | X | X | X | O | X | X | X | O |
| C | O | O | Y | X | O | X | X | X | O | O | X | X |

When the splitting liquid (no excess of residual acid) was added to the weak liquor the programmed, automatic washing with 45% by weight liquor was not sufficient. It was necessary to shut down the final thickener once a day and wash with a weaker liquid, entailing loss in capacity.

When the splitting liquid was instead added to the final thickener in accordance with the invention, the automatic washing with the 45% black liquor was sufficient to keep the heating surfaces clean and there was no need for a shutting down for washing.

The temperature drop over the whole six-step plant was lowered by 8°–10° C.

The invention, which has been described as applied to the sulphate process, using splitting liquid from splitting of soap skimmings and residual acid from the production of chlorine dioxide to cover the chemical losses, is also applicable when other dilute solutions are used for covering the chemical losses as well as in evaporation of different spent liquors where similar problems are involved, e.g. in evaporating certain types of sulphite waste liquor.

I claim

1. In the process of evaporation of a waste liquor from a pulping process to recover useful chemicals wherein the dilute waste liquor is evaporated in a plurality of evaporation stages to obtain thick waste liquor, and concentrated in a thickener, the thickener comprising at least two zones, a solution of a residual product from other processes is added to the waste liquor, said residual product being a member selected from the group consisting of (1) spent acid from a chlorine dioxide production plant and (2) spent acid from a tall oil plant, wherein during operation, at least one zone of said thickener is washed with thick waste liquor from a preceding evaporation stage, the improvement which comprises introducing said residual product to a zone of said thickener which is not being washed with thick waste liquor from a preceding evaporation stage.

2. The process according to claim 1, wherein said waste liquor from a pulping process is the sulfate liquor.

3. The process according to claim 1, wherein the thickener is a heat exchanger.

* * * * *